Sept. 23, 1958   C. G. FITZGERALD ET AL   2,853,517
PREPARATION OF SUBSTITUTED PHOSPHINIC NITRIDES
Filed March 7, 1956
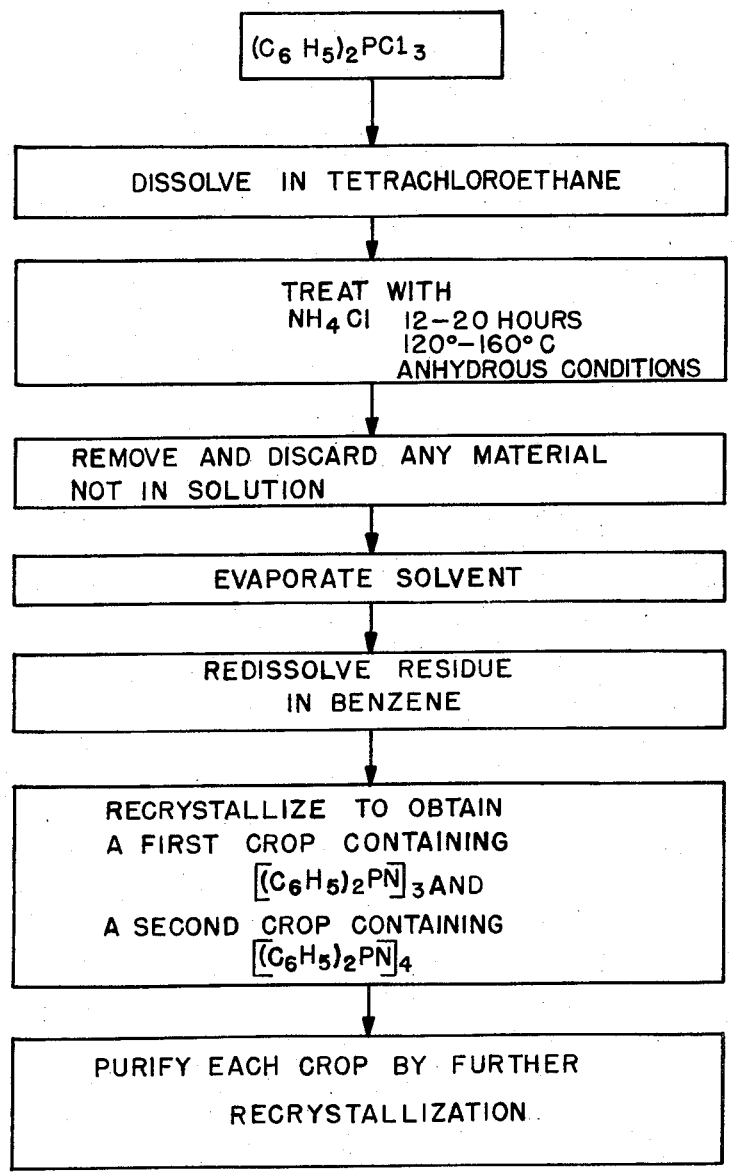
INVENTOR
Charles P. Haber
Emil A. Lawton
Cornelius G. Fitzgerald
BY
ATTORNEYS

2,853,517

PREPARATION OF SUBSTITUTED PHOSPHINIC NITRIDES

Cornelius G. Fitzgerald, Ann Arbor, Mich., Charles P. Haber, Riverside, Calif., and Emil Abraham Lawton, Columbus, Ohio, assignors to the United States of America as represented by the Secretary of the Army Application March 7, 1956, Serial No. 570,193

1 Claim. (Cl. 260—551)

(Granted under Title 35, U. S. Code (1952), sec. 266)

The invention described herein may be manufactured and used by or for the Government for governmental purposes without the payment to us of any royalty thereon.

This invention relates to an improved method of preparing substituted phosphinic nitrides. The method of the invention is more convenient and economical and gives higher yields than the previous method.

Polymeric disubstituted phosphinic nitrides—materials of the form $(R_2PN)_x$, where R is a phenyl or other aryl group—are of increasing practical interest because they appear to offer exceptional thermal and chemical stability at elevated temperatures. Previously, these products have been made by reactions of the appropriate Grignard reagent with phosphonitrilic chlorides. However, this old method is long and tedious, can be used only for relatively small batches, requires expensive intermediates for the Grignard reagent, and gives extremely low yields. Indeed, the reported results of earlier workers using this method (Rosset, H., Compt. rendu 110, 750 (1925); Bode, H. and Thamer, R., Ber., 76, 121 (1943)) have been difficult to duplicate; the present inventors know of skilled chemists who have been unable to do so.

An object of the present invention is to provide an improved, more convenient, more economical method for the preparation of disubstituted phosphinic nitrides and polymers thereof.

Briefly, a preferred practice of the invention comprises treating compounds of the form $R_2PX_3$ (where R is a phenyl or other aryl group and X is a halogen) with ammonia or an ammonium salt to obtain various desired polymeric disubstituted phosphinic nitrides—i. e., products of the form $(R_2PN)_x$. The basic reaction is $$x(R_2PX_3) + x(NH_4X) \rightarrow (R_2PN_x + 4x(HX)$$

In the old method $(PNCl_2)_{3,4}$ was prepared by the reaction of $PCl_5$ and $NH_4Cl$. The crude $(PNCl_2)_3$ and $(PNCl_2)_4$ then had to be purified by a tedious method. Finally, the purified material was reacted with the appropriate Grignard reagent to give $(R_2PN)_3$ and $(R_2PN)_4$ in extremely low yields.

Other objects, aspects, uses, and advantages of the invention will become apparent from the following description and from the accompanying drawing.

The drawing is a flow chart showing the principal steps in a preferred preparation of a disubstituted phosphinic nitride in accordance with the method of the invention.

The following example of a particular preparation carried out by the present inventors will disclose and illustrate the practice of the invention. $(C_6H_5)_2PCl_3$, is dissolved in anhydrous tetrachloroethane or other suitable solvent, and a slight excess of anhydrous ammonium chloride, $NH_4Cl$, is added. A temperature of from 100° to 200° C., and preferably between 120° and 160° C., is maintained for from 12 to 20 hours. Anhydrous conditions are maintained, and we believe that it is probably also desirable to exclude oxygen. Under these conditions the reaction $$x(C_6H_5)_2PCl_3 + xNH_4Cl \rightarrow [=(C_6H_5)_2PN]x + 4xHCl$$

takes place.

Any material not in solution is then removed and discarded. The solvent is removed by evaporation. The residue is redissolved in benzene, and the benzene solution is extracted with dilute aqueous NaOH to remove unreacted $(C_6H_5)_2PCl_3$ and $(C_6H_5)_2POOH$. We have also used petroleum ether, alcohol, carbon tetrachloride, and chloroform, instead of benzene.

Recrystallization from the benzene solution now gives a first crop that is essentially the impure trimer, $$[(C_6H_5)_2PN]_3$$

and a second crop that is essentially the impure tetramer, $[(C_6H_5)_2PN]_4$. The later crops contain higher polymers of $(C_6H_5)_2PN$ and probably other materials that have not been identified.

The impure trimer and the impure tetramer can be purified by a further recrystallization of each. Combined yields of purified trimer and tetramer of about 10 percent are obtained, about half trimer and half tetramer.

It will be apparent to skilled chemists that $(C_6H_5)_2PCl_3$ is only an example of a large number of compounds of the form $R_2PX_3$ that can be used as starting materials in the method of the invention. In this general expression, R can be any phenyl or other aryl group and X can be any halogen, provided only that the compound is not unstable under the conditions of the preparation.

We claim:

The method of preparing $[(C_6H_5)_2PN]_n$, where $n$ has values of three and four, which method comprises: treating $(C_6H_5)_2PCl_3$ with anhydrous ammonium chloride in a solvent of anhydrous tetrachloroethane under anhydrous conditions at a temperature between 100° and 200° C.; evaporating the tetrachloroethane from the solution to obtain a residue of nonvolatile solutes; redissolving said residue in benzene to obtain a second solution; extracting said second solution with a dilute aqueous solution of sodium hydroxide to remove unreacted $$(C_6H_5)_2PCl_3$$

and $(C_6H_5)_2POOH$ from the second solution; and recrystallizing from said second solution to obtain $$[(C_6H_5)_2PN]_3 \text{ and } [(C_6H_5)_2PN]_4$$

References Cited in the file of this patent

UNITED STATES PATENTS 2,374,646   Brown ------------------ May 1, 1945

OTHER REFERENCES

Annalen, vol. 326, page 132 (1903).

Moureu et al.: Chemical Abstracts, vol. 29, page 3930 (1935).

Kosolapoff, Organophosphorus Compounds, John Wiley and Sons, Inc., New York (1950), page 70.